(12) United States Patent
Hurley et al.

(10) Patent No.: US 6,518,341 B1
(45) Date of Patent: Feb. 11, 2003

(54) METHOD FOR REDUCING MOLD DEPOSIT FORMATION DURING MOLDINGS OF POLYAMIDE AND COMPOSITION THEREFOR

(75) Inventors: James M. Hurley, Atlanta, GA (US); Bruce H. Bersted, Alpharetta, GA (US)

(73) Assignee: Solvay Advanced Polymers, LLC, Alpharetta, GA (US)

( * ) Notice: Subject to any disclaimer, the term of this patent is extended or adjusted under 35 U.S.C. 154(b) by 0 day.

(21) Appl. No.: 09/594,329

(22) Filed: Jun. 15, 2000

Related U.S. Application Data

(60) Provisional application No. 60/140,435, filed on Jun. 18, 1999.

(51) Int. Cl.$^7$ .............................. C08J 5/10; C08K 5/17; C08L 77/00

(52) U.S. Cl. ..................... 524/258; 524/323; 524/492; 524/493; 524/494; 524/401; 524/80

(58) Field of Search ................................ 524/440, 492, 524/493, 251, 258, 401, 80, 323

(56) References Cited

U.S. PATENT DOCUMENTS 5,436,294 A * 7/1995 Desio et al. ................... 525/66
5,763,561 A * 6/1998 Keske ......................... 528/310
5,814,384 A * 9/1998 Akkapeddi et al. ......... 428/35.7

* cited by examiner

*Primary Examiner*—James J. Seidleck
*Assistant Examiner*—U. K Rajguru
(74) *Attorney, Agent, or Firm*—McDermott, Will & Emery

(57) ABSTRACT

A composition comprising a high temperature partially aromatic polyamide, an impact modifier, a secondary aryl amine, and a copper stabilizer.

18 Claims, No Drawings

METHOD FOR REDUCING MOLD DEPOSIT
FORMATION DURING MOLDINGS OF
POLYAMIDE AND COMPOSITION
THEREFOR

This application claims the benefit of U.S. Provisional Application No. 60/140,435, filed Jun. 18, 1999.

BACKGROUND OF THE INVENTION

This invention relates to polyamides, and more particularly to an improvement in thermally stabilized polyamide molding resins and compositions. Still more particularly, this invention is directed to thermally stabilized, impact modified polyamide injection molding formulations having a reduced tendency toward burning and discoloration in the molded part. The invention may be further described as directed to a method for reducing mold burning of injection molding formulations comprising impact modified, partially aromatic polyamides containing a copper halide heat stabilizer.

Polyamides generally exhibit a balance of thermal, strength and stiffness properties which make them suitable for many applications. The resins are particularly attractive for use in applications where resistance to chemical and thermal attack is required. Aliphatic polyamides, termed nylons, generally are readily processed thermally and have gained wide acceptance in the molding arts and in the extrusion arts, including fiber spinning and film extrusion.

Partially aromatic polyamides and copolyamides have been developed for use in high temperature applications, and crystalline and semi-crystalline copolyamides comprising at least about 40 mole % partially aliphatic terephthalamide units are known for their particularly good thermal properties and performance in demanding environments. However, such polyamides typically have relatively high melting points e.g., about 290° C. or higher, and the degradation temperatures for some do not greatly exceed their melting points; accordingly, requirements for melt processing and molding these polyamides are more rigorous and complex than those for polyamides such as nylon 6,6, melting at about 260–265° C.

Fabricating high temperature, partially aromatic polyamides for the production of molded articles, extruded profile goods, laminates or the like, particularly when filled, requires processing the resin at temperatures very near the resin decomposition temperature, together with severe shear stress during molding or extrusion operations. Good resin thermal stability is critically important to attaining good properties in the molded part as well as to maintaining those properties in a variety of uses, particularly in demanding environments.

The art of stabilizing resins against deterioration through exposure to thermal oxidative environments is well-developed. The decomposition of aliphatic polyamides has been the subject of a great many studies, and numerous additives have been proposed for improving their thermal oxidative resistance, both during processing and while in use. Stabilizers act to inhibit the oxidation processes, preserving the aliphatic polyamide chain intact. Stabilizer compositions comprising copper(I) halide and an alkali metal halide are described in the art for use with polyamides, and the use of complex compounds comprising copper salts and diamines has also been disclosed. Heat stabilizers comprising combinations of copper halides, alkali metal halides and phosphorus compounds have been employed for use in polyamide molding resins and the like, as shown for example in U.S. Pat. No. 4,937,276.

The aliphatic segments of high temperature, partially aromatic polyamides are subject to the same thermal-oxidative decomposition processes, and the thermal stabilizers for aliphatic polyamides have also been found useful with these polyamides. However, partially aromatic polyamides generally require higher processing temperatures and otherwise are likely to be subjected to more severe conditions. Stabilizers commonly employed with aliphatic polyamides may partially decompose thermally during processing at these elevated temperatures and form gaseous products that detrimentally affect the properties or appearance of molded and extruded goods. Where substantial degradation occurs, these byproducts may also result in splay formation in molded articles. Methods and compositions for overcoming these difficulties are disclosed in the art, for example in U.S. Pat. No. 5,763,561.

Partially aromatic polyamide molding resin formulations may further include additional resin components such as impact modifiers, flow improvers and the like. Modifiers in wide commercial use for these purposes include polyolefins and modified polyolefins such as, for example, those described in U.S. Pat. No. 5,436,294. Polyolefin modifiers are known to be sensitive to thermal oxidative attack, becoming crosslinked and severely degraded when subjected to the high temperatures generally employed when molding partially aromatic polyamides. Moreover, copper compounds such as are found in the heat stabilizers commonly used with polyamides tend to accelerate the thermal decomposition of olefin-based resin modifiers.

Importantly, injection molding of intricate, detailed parts requires the use of cavity molds with many small or narrow spaces. The molds are supplied with vents positioned to allow air displaced by the molten resin, as well as any entrained gases and gaseous decomposition products, to escape from these areas of the mold cavity so that the molten resin may completely fill the mold. Thermal decomposition byproducts, together with small amounts of other volatile components, for example, processing aids, stabilizers or other low molecular weight solids, may be entrained by the escaping gases, carried into the vents and become deposited on cooler surfaces within these passages. In the molding of copper stabilized, high temperature polyamide formulations, this problem appears to be particularly exacerbated by the presence of olefinic modifiers.

During extended molding operations using copper stabilized, impact modified polyamides these deposits build up over time and form a solid, intractable residue within the vent passages that clogs or plugs the vents. Escape of the hot gases and decomposition byproducts is then blocked, causing adiabatic compression of the polyamide resin in the final feed zone, raising the mold temperature. The resin then becomes carbonized and darkened, a condition called "gas burning", resulting in visible imperfections including discoloration or "burn" marks and other unacceptable cosmetic flaws in the molded parts. The molding operation must then be halted while the mold is cleaned. Moreover, because the refractory, intractable residues produced in molding these polyamide formulations are difficult to remove without damage to the cavity surfaces, a costly replating or other refinishing of the mold cavity may then be necessary.

Methods and compositions for providing copper stabilized, impact modified, high temperature polyamide resin formulations that will undergo injection molding without producing unacceptable levels of vent-clogging deposits are clearly needed by the resin molding art. Such improvement in polyamide molding formulations would provide a significant reduction in costs by significantly extending the time between mold cleanings, thereby avoiding the need for frequent shutdown of the molding operation.

SUMMARY OF THE INVENTION

This invention is directed to methods for providing copper stabilized, impact modified polyamide molding resin formulations comprising a high temperature, partially aromatic polyamide and to improved impact-modified polyamide injection molding resin formulations having a reduced tendency toward burning and discoloration in the molded part.

Injection molding formulations according to the invention exhibit excellent thermal stability, together with a reduced rate of accumulation of mold deposits, thereby increasing the time between mold cleanings and reducing the occurrence of burned or discolored molded goods. The invented formulations are particularly useful in the manufacture of injection molded and extruded goods intended for extended use in demanding environments and at elevated temperatures and where resistance to chemical and thermal attack is an important consideration.

DETAILED DESCRIPTION OF THE INVENTION

The impact modified polyamide injection molding resins and compositions of this invention comprise a partially aromatic polyamide together with a polyolefin-based impact modifier, a copper-containing stabilizer composition and a low volatility, high molecular weight organic compound selected from hindered phenols and secondary aryl amines.

Partially aromatic polyamides useful in the practice of this invention contain units derived from one or more aliphatic diamines and one or more aromatic dicarboxylic acids, including copolymers containing such units. More particularly, the polyamides suitable for use in the practice of this invention include the various linear, thermoplastic, high temperature, partially aromatic polyamides and copolymer analogs thereof, frequently termed partially aromatic nylons, that require high processing temperatures and are thus difficult to melt process without deterioration. Polyamides that are crystalline or crystallizable are preferred, and particularly preferred are the crystalline or semi-crystalline, high temperature copolyamides comprising terephthalamides of aliphatic diamines. Such copolyamides typically comprise as structural units terephthalamides of one or more $C_4$–$C_{14}$ aliphatic diamines such as hexamethylene diamine or the like, including diamines having one or more $C_1$–$C_4$ alkyl substituents attached to the hydrocarbon portion. In addition to the terephthalamide units, these copolyamides may further comprise as structural units one or more additional diamides of such aliphatic diamines, for example diamides derived from aromatic dicarboxylic acids or related compounds such as isophthalic acid, naphthalene dicarboxylic acid or the like, as well as diamides derived from aliphatic diamines and $C_4$–$C_{14}$ aliphatic dicarboxylic acids or related compounds such as diamide units derived from adipic acid, sebacic acid, cyclohexane dicarboxylic acid and similar dicarboxylic acids. It is well known that the crystallizability of polyterephthalamides may be affected by the presence of additional structural units such as, for example, isophthalamide units, and the presence of such units in the copolymer at high levels may cause the polyterephthalamide to be noncrystallizable and thereby amorphous. Hence, where a high degree of crystallinity in the polyamide and rapid crystallization are important considerations, it will be desirable to avoid the use of additional diamide units that are known to lessen crystallizability or to employ such units at a level that will not prevent crystallization.

A variety of polyamides comprising terephthalamide units are known in the art, and copolyamides comprising a combination of hexamethylene terephthalamide units and hexamethylene adipamide units, optionally including hexamethylene isophthalamide units, are known. Particularly desirable for use in the practice of this invention are copolyamides comprising at least 40 mole % hexamethylene terephthalamide units, the balance being hexamethylene adipamide units, either alone or in combination with up to about 30 mole % hexamethylene isophthalamide units. Also useful for these purposes are the crystallizable polyamides comprising terephthalamides of two or more diamines such as hexamethylene diamine and 2-methyl-pentamethylene diamine.

In greater detail, the polyamide component of the invented compositions may be a crystallizable polyamide comprising at least about 40 mole %, preferably from about 40 to 100 mole %, recurring aliphatic diamine terephthalamide units which may be further described as represented by the following structural formula:

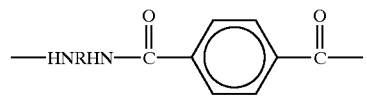

wherein R comprises at least one aliphatic hydrocarbyl radical.

Preferably, aliphatic radicals R in the above formula will comprise at least one $C_4$–$C_{14}$ aliphatic hydrocarbyl radical, more particularly, at least one straight chain, branched or cyclic, substituted or unsubstituted aliphatic radical having from about 4 to about 14 carbon atoms. Polyamides comprising such radicals exhibit good crystallinity and desirable high temperature properties, together with melting and thermal degradation temperatures making them well suited for melt processing and fabricating in injection molding and extrusion operations. Specific examples of suitable aliphatic radicals include tetramethylene, hexamethylene, dodecamethylene and the like, as well as their alkyl-substituted analogs such as 2-methylpentamethylene, 2,4-dimethylhexamethylene and the like, and cyclic analogs such as p-cyclohexyl and the like. Most preferably, R in the formula comprises a hexamethylene radical, either alone or as mixture with additional aliphatic 4 to 14 carbon atom radicals. The preferred polyamide components will have a melting point of at least about 270° C. as a result of the high content of terephthalamide units; still more preferred are polyamide components melting at about 290° C. to about 330° C.

The polyamides suitable for use in this invention may be more particularly described as crystallizable or semi-crystalline partially aromatic polyamides of fast or intermediate crystallization rate comprising recurring units corresponding to structural formulas A, B and C as shown below in proportions of about 40 to about 100 mole % A, 0 to about 35 mole % B and about 0 to about 60 mole % C.

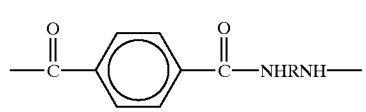

A

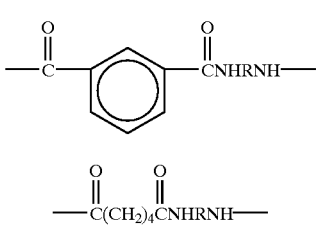

B

C

In the above formulas, R comprises at least one aliphatic hydrocarbyl radical as described hereinabove, and may represent a mixture of aliphatic 4 to 14 carbon radicals; the mole ratio of the units A, B and C may lie in the range of about 40–100:35–0:60–0.

More preferred among such polyamides are those wherein the mole ratio of the units A, B and C lies in the range of about 40–90:35–0:50–5, and still more preferable are those within the range of about 40–70:30–0:50–5, because such compositions exhibit excellent thermal and mechanical properties. Such polyamides typically have melting points of about 280 to about 350° C., preferably about 290 to about 330° C., glass transition temperatures ($T_g$) of about 80 to about 130° C., preferably about 90 to about 130° C. and inherent viscosities generally ranging about 0.7 to about 1.4 dl/g, with about 0.8 to about 1.2 dl/g being preferred from the standpoint of properties of molded parts and ease of molding.

Especially preferred among such polyamides are those wherein R in the above formulas comprises hexamethylene. Also highly suitable as the polyamide component of the invented compositions are polyamides comprising two of the units A, B and C shown above, such as those with mole ratios of A:B:C in the range of 30–70:30–0:55–0, and polyamides containing A, B and C units at ratios of 45:0:55, 60:0:40, 65:0:35, 65:25:10 and 55:0:45. Terpolymers with minor amounts of the isophthalamide component B, for example in mole ratios such as 50:5:45, 40:5:55 and 70:30:0 and the like, may be found particularly desirable for use where lower melt temperatures will be encountered.

Other copolymers comprising terephthalamide units may also be found useful, including copolymers comprising terephthalamide units and units derived from lactams such as copolymers of hexamethylene terephthalamide and caprolactam and terpolymers comprising hexamethylene terephthalamide, hexamethylene adipamide and units derived from caprolactam.

Suitable partially aromatic polyamide and copolyamide resins are fully described in, for example, U.S. Pat. Nos. 4,831,108; 5,112,685; 4,163,101 and RE34,447, and in U.S. Pat. Nos. 5,288,793, 5,378,800; 5,322,923 and 5,218,082; the disclosures of these patents are hereby incorporated herein by reference. Partially aromatic polyamides are readily prepared using processes known and described in the art such as, for example, the continuous and batch processes set forth in U.S. Pat. Nos. 4,603,193; RE34,447 and 5,387,645, the disclosure of these patents are hereby incorporated by reference. The term "polyphthalamide" as set forth in ASTM D5336-93 is reserved for polyamides wherein the combined content of terephthalamide and isophthalamide units is at least 60 mole %. However, through common use in the art, the term has become widely associated with any polyamide that contains phthalamide units, irrespective of the amount of such units or whether the units are terephthalamide or isophthalamide units.

The molecular weight of the polyamide will be generally selected to meet the requirements of the particular end use envisioned and of the processing methods contemplated for the fabrication, according to practices widely known in the resin arts. For example, fiber grade polyamides will be best suited when fiber and filament uses are contemplated, while those identified by the art as extrusion grade and injection molding grade resins will be employed for those uses. Suitable resins may be further described as generally having inherent viscosities (IV) greater than about 0.6, preferably greater than about 0.7, more preferably greater than about 0.8 when measured at 30° C. in a 60/40 phenol/tetrachloroethylene (TCE) mixture at a concentration of 0.4 g/dl. Although there is no particular upper limit for molecular weight to be suitable for use in these compositions, very high molecular weight polyamides, those with an inherent viscosity as great as 2.0 or even greater, may be extremely difficult to process thermally, and hence will not be preferred.

Injection molding formulations according to the invention further comprise at least one polyolefin-based impact modifier.

The impact modifiers commonly employed in the art for use with polyamides may generally be described as rubbery polyolefins and modified polyolefins, and more particularly as functionalized polyolefins. Functionalized block copolymers, for example, a maleic anhydride-modified block copolymer comprising polymerized styrene blocks and olefinic rubber blocks wherein the polymerized styrene content is from about 5 to about 50 weight percent, preferably from about 10 to about 35 weight percent, provides desirable improvements in toughness.

The rubber blocks of the modified block copolymer may comprise ethylene/propylene, ethylene/butylene or ethylene/pentylene polymer blocks or combinations thereof. Proportions of ethylene and propylene, butylene or pentylene units in these blocks can vary widely. Such blocks may also contain minor amounts of ethylenic unsaturation, preferably no more than about 15 weight percent unsaturation inasmuch as higher levels may lead to inadequate thermal stability of the functionalized block copolymers.

The functionalized block copolymer suitably comprises from about 0.1 to about 10 weight percent pendant succinic anhydride groups, with about 0.5 to about 5 weight percent being preferred. Although still lower levels may be employed, low levels may lead to inadequate incorporation of the modifying component into the polyphthalamide component. Levels greater than about 5 wt. % generally do not provide appreciable benefits, and are thus not preferred. These pendant groups are bonded predominantly to one or more of the secondary or tertiary carbons of the propylene, butylene or pentylene groups or to benzylic carbons of the styrene groups. Preferably, the block copolymer is a hydrogenated block copolymer comprising one or more polymerizable vinyl aromatic monomers such as styrene, alpha methylstyrene, vinyl toluene, vinyl naphthalene or the like, and one or more conjugated diene monomers copolymerizable therewith. Suitable copolymers include block copolymers of styrene and 1,3-butadiene or isoprene hydrogenated to have residual unsaturation of up to about 10% of its original unsaturation content. In such hydrogenated styrene-butadiene block copolymers the rubber blocks comprise ethylene/butylene polymer blocks with proportions of ethylene and butylene units varying depending on the relative levels of 1,2 and 1,4 addition of the diene in the unhydrogenated copolymer. It also is preferred that the pendant succinic anhydride groups result from reaction of such a hydrogenated block copolymer with maleic anhydride. These and other suitable functionalized rubbery block copolymer impact modifiers and methods for their preparation are described in U.S. Pat. No. 4,795,782, to Gergen and Lutz, the disclosures of which are hereby incorporated herein by reference.

A specific example of a preferred functionalized rubbery impact modifier suitable for use according to the present invention is a styrene/ethylene/butylene-styrene block copolymer with pendant succinic anhydride groups, which is available commercially as Kraton® FG1901X rubber from Shell Chemical Company. The modifier may also be described as a maleic anhydride-grafted, hydrogenated styrene-butadiene block copolymer, or as a maleated SEBS. This product contains about 29 weight percent polymerized styrene, about 2 weight percent pendant succinic anhydride groups and has a glass transition temperature of its hydrogenated, polymerized butadiene block of about −42° C. Onset of thermal degradation of this material occurs between about 270° C. and about 315° C., as determined by Thermal Gravimetric Analysis, and the manufacturer's literature (MSDS 2,898-1, dated Jun. 22, 1987) states that in processing, temperature should not be allowed to exceed 550° F. (287° C.).

The functionalized block copolymer can be prepared by any suitable technique. One such method is as disclosed in the previously discussed published European Patent Application no. 0211467 of Gelles et al., which is incorporated herein by reference. As disclosed therein, styrene-butadiene block copolymers having about 7 to about 100 percent 1,2-microstructure are prepared by polymerization of styrene and 1,3-butadiene with sequential or incremental addition of monomers or by coupling techniques. The monomers preferably are utilized so as to provide about 10 to about 50, and more preferably, about 10 to about 35 weight percent polymerized styrene in the block copolymer. Hydrogenation of such copolymers can be conducted by known techniques, for example by hydrogenation of the block copolymer dissolved in a hydrocarbon solvent, such as cyclohexane, in the presence of Raney nickel, noble metal or soluble transition metal catalysts. The hydrogenation is conducted substantially to eliminate residual unsaturation in the diene block of the block copolymer although a small amount of residual unsaturation, e.g. up to about 10 percent of the original unsaturation content, may remain in the hydrogenated product. The hydrogenated product, comprising styrene and ethylene/butylene blocks, then is grafted to provide about 0.5 to about 5 weight percent pendant succinic anhydride groups by reaction with maleic anhydride. Preferably, this reaction is conducted using a free radical initiator. The grafting reaction can be conducted in solution or in the melt. Similar techniques can be utilized for preparation and hydrogenation of styrene-isoprene or styrene-butadiene-isoprene co- or terpolymers and grafting of the hydrogenated polymers. Another suitable method, wherein pendant succinic anhydride groups are bonded predominantly to benzylic carbons of styrene units of the block copolymer, is that disclosed in the aforementioned U.S. Pat. No. 4,783,503 to Gergen et al. which is incorporated herein by reference.

Alternative functionalized rubbery impact modifiers that may also be used in the practice of the invention include ethylene polymers, ethylene-higher alpha-olefin polymers and ethylene-higher alpha-olefin-diene polymers that have been provided with reactive functionality by being grafted or copolymerized with suitable reactive carboxylic acids or their derivatives such as, for example, acrylic acid, methacrylic acid, maleic anhydride or their esters, and preferably will have a tensile modulus up to about 50,000 psi determined according to ASTM D-638. Suitable higher alpha-olefins include $C_3$ to $C_8$ alpha-olefins such as, for example, propylene, butene-1, hexene-1 and styrene, with propylene being preferred. Alternatively, copolymers having structures comprising such units may also be obtained by hydrogenation of suitable homopolymers and copolymers of polymerized 1,3 diene monomers. For example, polybutadienes having varying levels of pendant vinyl units are readily obtained, and these may be hydrogenated to provide ethylene-butene copolymer structures. Similarly, hydrogenation of polyisoprenes may be employed to provide equivalent ethylene-isobutylene copolymers.

Suitable dienes for use in the preparation of ethylene-alpha-olefin-diene terpolymers are non-conjugated dienes having 4 to about 24 carbon atoms, examples of which include 1,4-hexadiene, dicyclopentadiene and alkylidene norbornenes such as 5-ethylidene-2-norbornene. Mole fractions of ethylene units and higher alpha-olefin units in the ethylene-higher alpha-olefin copolymer rubbers generally range from about 40:60 to about 95:5. Ethylene-propylene copolymers having about 70 to about 95 mole percent ethylene units and about 5 to about 30 mole percent propylene units are preferred among these. In terpolymers comprising polymerized diene monomer, the diene unit content can range up to about 10 mole percent with about 1 to about 5 mole percent being preferred. Also suitable are the corresponding block copolymers comprising two or more polymeric blocks, each formed of one or more monomers selected from ethylene and the higher alpha-olefin. The functionalized polyolefins will generally further comprise about 0.1 to about 10 weight percent functional groups. Specific examples of suitable, commercially-produced functionalized polyolefins include maleic anhydride-functionalized ethylene-propylene copolymer rubber comprising about 0.6 weight percent pendant succinic anhydride groups, identified as EXXELOR® VA 1801 from Exxon Chemical Company; and maleic anhydride-functionalized ethylene-propylene-diene monomer terpolymer rubber comprising about 1 weight percent pendant succinic anhydride groups, identified as ROYALTUF 465 from the Uniroyal Company.

The invented blends will comprise up to about 50 parts, preferably from about 5 to about 50 parts by weight of the modifier components, based on a total of 100 parts by weight of the stabilized polyamide component. The blends may be described in the alternative as comprising from 50 to 95 wt. % of the polyphthalamide component and from about 50 to about 5 wt. % of the aforesaid modifier component.

Generally, improvement in room temperature impact properties will be observed at low levels, generally from about 2.5 up to about 10 wt. % of the functionalized polyolefin, while highly ductile, very high impact resin formulations may be produced when the level of functionalized polyolefin is further increased, up to levels of about 15 to 30 wt. %. As the level of functionalized rubbery polyolefin is further increased, there is a marked reduction in rigidity for the formulations as reflected in modulus properties, and this loss in rigidity, together with a reduction in other mechanical properties including tensile properties and toughness, will defeat the goal of providing improved ductility while maintaining an excellent property balance of mechanical properties. However, for particular end uses such as in applications where retention of mechanical properties at extremely low temperature, and particularly where good low temperature ductility and impact are important, formulations with levels of impact modifier as great as 25 to 30 wt. % may be desirable even though there is a concomitant loss in toughness.

The relative amounts of the modifier components will be selected to achieve a desirable combination of impact, strength, processability and stiffness properties at reduced cost. Generally, the amount employed will be selected to be lowest quantity necessary to provide the desired improvement impact properties, and will preferably lie in the range of from about 2.5 to about 40 wt. % of the blend. Although greater quantities of the modifier may be employed, little, if any, further improvement in impact will be realized, and the goal of minimizing costs will thus be defeated by use of such higher levels. For maximum impact strength with a desirable combination of high tensile strength and flexural modulus, preferred proportions are about 70 to about 85 wt. % polyphthalamide component, and about 10 to about 30 wt. % functionalized polyolefins modifier, based on the total weight of resin components.

For maximum impact strength with a desirable combination of high tensile strength and flexural modulus, preferred proportions are about 70 to about 85 wt. % polyphthalamide component, and about 10 to about 30 wt. % functionalized polyolefins modifier, based on the total weight of resin components.

The polyamide molding resin formulations according to the practice of this invention will further include a copper-containing stabilizer. Copper-containing stabilizers that may be used for these purposes may be further characterized as comprising a copper compound soluble in the polyamide and an alkali metal halide. More preferably, the stabilizer is a copper(I) salt, for example cuprous acetate, cuprous stearate, a cuprous organic complex compound such as copper acetylacetonate, a cuprous halide or the like, and an alkali metal halide. Preferably, the stabilizer is a copper halide selected from copper iodide and copper bromide and an alkali metal halide selected from the group consisting of the iodides and bromides of lithium, sodium and potassium. Stabilizing formulations comprising copper(I) iodide and potassium iodide are particularly useful in the practice of the invention.

The amount of the copper-containing stabilizer will be selected according to the practice in the art to provide a level of from about 50 to about 1000 parts per million by weight (ppm) copper relative to the polyamide present. The weight ratio of the alkali metal halide to copper(I) halide will preferably lie in the range of from about 2.5:1 to about 20:1, and most preferably from about 8:1 to about 10:1. Generally, the combined weight of copper compound and alkali metal halide in the stabilized polyamide will amount to about 0.01 to about 2.5 wt. %, preferably from about 0.1 to about 1.5 wt. %, based on the combined weight of polyamide and copper-containing stabilizer.

The polyamide molding resin formulations of this invention will further comprise a high molecular weight organic compound having low volatility capable of reducing the rate of accumulation of the mold deposits during injection molding of the formulation. Preferably, the high molecular weight organic compound will be selected from the group consisting of secondary aryl amines and hindered phenols and may be further characterized as having a molecular weight of at least 260 g/m, together with a 10% weight loss temperature as determined by thermogravimetric analysis (TGA) of at least 290° C., more preferably at least 300° C. and most preferably at least 310° C. For the purposes of this invention, TGA weight loss will be determined according to ASTM D 3850-94, using a heating rate of 10° C./min. in air purge stream, with an appropriate flow rate of 0.8 mL/s.

By secondary aryl amine is meant an amine compound that contains two substituents chemically bound to a nitrogen atom where at least one, and preferably both substituents, are aromatic. Preferably, at least one of the aromatic substituents, such as, for example, a phenyl, naphthyl or heteroaromatic group, is substituted with at least one substituent, preferably containing 1 to about 20 carbon atoms. The secondary aryl amines preferred for use in the practice of this invention are those having a molecular weight of at least about 260, and a low volatility, characterized by a 10% TGA weight loss temperature of at least 290° C., more preferably at least 300° C. and most preferably at least 310° C.

Examples of suitable secondary aryl amines include 4,4' di($\alpha,\alpha$-dimethyl-benzyl)diphenylamine available commercially as Naugard 445 from Uniroyal Chemical Company, Middlebury, Conn.; the secondary aryl amine condensation product of the reaction of diphenylamine with acetone, available commercially as Aminox from Uniroyal Chemical Company; and para-(paratoluenesulfonylamido) diphenylamine also available from Uniroyal Chemical Company as Naugard SA. Other suitable secondary aryl amines include N,N'-di-(2-naphthyl)-p-phenylenediamine, available from ICI Rubber Chemicals, Calcutta, India.

By hindered phenol is meant an organic compound containing at least one phenol group wherein the aromatic moiety is substituted) at least at one and preferably at both positions directly adjacent to the carbon having the phenolic hydroxyl group as a substituent. The substituents adjacent the hydroxyl group are alkyl radicals suitably selected from alkyl groups having from 1 to 10 carbon atoms, and preferably will be tertiary butyl groups. The molecular weight of the hindered phenol is suitably at least about 260, preferably at least about 500, more preferably at least about 600. Most preferred are hindered phenols having low volatility, particularly at the processing temperatures employed for molding the formulations, and may be further characterized as having a 10% TGA weight loss temperature of at least 290° C., more preferably at least 300° C. and most preferably at least 310° C.

Suitable hindered phenol compounds include, for example, tetrakis (methylene (3,5-di-(tert)-butyl-4-hydroxyhydrocinnamate)) methane, available commercially as Irganox 1010 from CIBA Specialty Chemicals, Tarrytown, N.Y. and N,N'-hexamethylene bis (3,5-di-(tert) butyl-hydroxyhydro-cinnamamide) also available from CIBA Specialty Chemicals as Irganox 1098. Other suitable hindered phenols include 1,3,5-trimethyl-2,4,6tris(3,5-di-(tert)-butyl-4-hydroxybenzyl) benzene and 1,6hexamethylene bis (3,5-di-(tert)butyl4hydroxy hydrocinnamate), both available from CIBA Specialty Chemicals as Irganox 1330 and 259, respectively.

The amount of hindered phenol or secondary aryl amine employed in the molding resin formulation will be an amount effective to reduce the rate of accumulation of mold deposits, thereby reducing burning or discoloration during molding. Suitably, the amount will lie in the range of from about 0.01 to about 3.0 wt. %, preferably from about 0.1 to about 2.0 wt. %, based on the weight of polyamide present in the composition.

The stabilized compositions of the present invention may be further compounded to include up to about 60 wt. % of various additives to improve or modify various chemical and physical properties. Examples of such additives include flame retardants, additional stabilizers and anti-oxidants, processing aids such as Teflon or polyethylene (PE) wax or the like, colorants, fillers and reinforcing agents. Suitable as reinforcing agents are glass fibers and carbon fibers including graphitic fibers. Metal fibers, alumina and aluminum silicate fibers, aluminum oxide fibers, rock wool fibers and the like may also be found useful for particular applications. Representative filler materials include particulate and powdered forms of calcium silicate, silica, clays, talc, mica, carbon black, titanium dioxide, wollastonite, polytetrafluoroethylene, graphite, alumina trihydrate, sodium aluminum carbonate, baryte and the like. The appropriate types and levels of such additives will depend on processing techniques and on the end use of the resultant product, and can be determined by those skilled in the art.

The invented compositions may be used in the production of injection molded articles, or fabricated into articles using any of a variety of processes and methods well-known and widely practiced in the fabricating arts, e.g. melt spinning of fibers, extrusion of sheet, tubing or film and the like. The compositions may also be used as matrix materials or binders for composite or laminated structures and may be further compounded with from 5 to 60 wt. % of one or more fillers including reinforcing fillers and the like for use in providing molded articles intended for use in severe environments.

Formulations according to this invention may be compounded using any of the variety of compounding and blending methods well-known and commonly used in the resin compounding arts. Conveniently, the polyamide and stabilizer, and fillers and modifying components, if any, may be used in powder, pellet or other suitable form. Preferably, the components will be melt compounded at temperatures effective to render the resinous components molten using a high shear mixer, e.g., a twin-screw extruder, to obtain a desirably uniform blend. The components may be first combined in solid form, such as powder or pellets, prior to melt compounding to facilitate mixing. Particulates, fibers and other additives may be incorporated into one or more of the components prior to combining with the remaining components, or the components may be physically mixed in powder or pellet form using conventional dry-blending methods and then extrusion compounded. Plasticating the resin in a compounding extruder and feeding the additives, particulates or fibers to the molten composition through a port in the extruder, as is also commonly practiced in the art, may be found useful in compounding the compositions of this invention.

The present invention will be better understood by consideration of the following examples provided to demonstrate particular embodiments thereof.

EXAMPLES

Polyamide Preparations

The polyamides used in the following examples are summarized below. A continuous process useful in preparing polyamides may be generally described and summarized as follows:

A large, steam-heated, stainless steel, stirred salt reactor is charged with the monomers and, when appropriate, water to provide an aqueous mixture of reactants such that the final polymers have the approximate mole ratios shown below. The mole ratio of total diamine (hexamethylene diamine) to total acids is selected in each case to provide polyamides having an amine-rich or an amine-poor stoichiometry as desired, and acetic acid may be added as a capping agent in appropriate amounts to achieve a specified level of amine end groups. Since the polymerizations are run without recycle of volatiles, excess reactant, particularly acetic acid and diamines, is employed to offset volatilization losses. The catalyst, sodium hypophosphite or phosphorous acid, is added to the reactor either as a solid or aqueous solution at levels to provide 400 ppm ($NaH_2PO_3$) or 125 ppm ($H_3PO_3$) phosphorus in the final polymer and the reactor is then sealed, purged with nitrogen, pressurized to about 2.8 $kg/cm^2$ (40 psig) with nitrogen, heated to about 120° C. and held at that temperature.

Contents of the salt reactor are pumped continuously to a jacketed, oil-heated concentrator fitted with a Research Control Valve to vent volatiles, and maintained under pressure of about 11.3–13.1 $kg/cm^2$ (160–185 psig) while heating the contents to about 220–225° C. The water content of the reaction mixture exiting the concentrator is reduced to less than about 15 wt. % using a residence time of about 15 minutes. The reaction mixture is continuously pumped from the concentrator to and through two oil-heated, stainless steel preheaters, arranged in series. The melt temperature at the exit of the first preheater is selectably maintained at about 279–290° C. and in the second at about 282–293° C.; a Research Control Valve is used to maintain the pressure in the preheaters at about 127 $kg/cm^2$ (1800 psig).

The reaction mixture exits the preheater continuously through the Research Control Valve into a jacketed tubular reactor at a pressure of about 7 $kg/cm^2$ (100 psig) heated to wall temperature of about 325–345° C. by circulating heat exchange fluid through the heating jacket. The reaction mixture is passed through another Research Control Valve to exit the reactor with a melt temperature maintained at not less than 310° C., and is introduced onto the screws of a Werner and Pfleiderer Corporation ZSK-30, vented, twin-screw extruder using a vent vacuum at the downstream (die end) port. The finished polymer is extruded through a strand die into a water bath at a through-put rate of about 5.8–6.4 kg/hr and then chopped into pellets.

The compositions and properties of the polyamide resins are summarized below. The mole ratios of the dicarboxylic acid units TA, IA and AA (terephthalyl, isophthalyl and adipyl) are given, together with the amounts of acid and amine endgroups as determined analytically for each of the resins, the I.V. (inherent viscosity) and Tg of the resins. Hexamethylene diamine is the diamine used.

Test Procedures

The molded articles were analyzed for inherent viscosity and for acid and amine endgroups, and were subjected to mechanical testing and thermal oxidative aging.

Inherent Viscosity Determination

Polymer, 0.100 g, was dissolved in 25 ml of 60:40 phenol:tetrachloroethane at 120–130° C. Efflux times of this solution and the solvent were determined using a Type 1C Cannon Ubbelohde Viscometer immersed in a constant temperature bath at 30° C.

The inherent viscosity in the units of dl/g was calculated from:

Inherent Viscosity=(In (solution time/solvent time))/concentration

Acid endgroup concentration was determined by dissolving 0.2 g polymer in ca. 6 ml o-cresol at 100° C., cooling, adding 4 to 6 ml of benzyl alcohol and 50 μl formaldehyde to the polymer solution, and titrating by potentiometric titration, using 0.1 N KOH in methanol.

Amine endgroup concentration was determined by dissolving 0.4 g polymer in ca. 12 ml hexafluoroisopropanol at 50° C., cooling, adding 0.1 ml water and titrating potentiometrically with 0.1 N HCl in water.

HDT (heat distortion temperature) was determined according to ASTM D-648 Method A.

Retention of Tensile Properties (Time to 50% Tensile Loss)

Tensile testing was carried out according to standard ASTM test procedures. For thermal-oxidative aging, the tensile specimens were aged in a circulating air oven at the indicated temperature for varying periods, using five tensile specimens for five to seven time periods. The tensile specimens were then tensile-tested at room temperature, and the data analyzed by fit to a cubic equation. The time period, in hours, for 50% loss in tensile strength was determined by interpolation.

Retained E (%)

Tensile test bars were aged at 155° C. for 1000 hr. (circulating air oven). Elongation at break was determined by ASTM D 638-97, and compared with the elongation at break value for unaged specimens; calculated as % retention.

Shots until Burn

The number of molding cycles under standardized molding conditions required to produce objectionable part burning/discoloration. Formulations were injection molded using a single gated, ¼×½×5 ⅜ inch bar mold with a restricted (0.005 mm×4.75 mm) vent. The temperature of the melt was 320° C.; temperature of the tool was 60° C. for unfilled resins (140° C. was used for molding glass fiber filled resins), and the average injection speed was 1.75 inches per second. Molding was continued until initial part burning occurred, and the number of cycles or "shots" was recorded.

Resins, Modifiers and Components

The components used in preparing the molding formulations of the following examples include:

PPA 1

Partially aromatic polyamide having a TA/IA/AA ratio= 65/25/10, prepared with a high level of amine endgroups substantially according to the process set forth above. T(m)= 305° C., T(g)=122° C. Intrinsic viscosity in Phenol/TCE (ISO 307)=0.87, amine end-groups=79 µeq/g, acid-end groups=37 µeq/g, T(g)=122° C.

PPA 2

Partially aromatic polyamide having a TA/IA/AA ratio= 65/25/10, prepared with a high level of amine endgroups substantially according to the process set forth above. T(m)= 305° C., T(g)=122° C. Intrinsic viscosity in Phenol/TCE (ISO 307)=1.0, amine end-groups=79 µeq/g, acid end group=38 µeq/g, T(g)=122° C., Modifier 1

Maleic-anhydride grafted LLDPE, obtained as Fusabond MB 226 D from DuPont, Wilmington, Del. Melting point= 122° C., Melt Index (190° C., 2.16 kg)=1.5.

Modifier 2

Hydrogenated SEBS (graft maleic anhydride) block copolymer, obtained as Kraton FG 1901X from Shell Chemical Co., Houston, Tex.

Aryl Amine 1

4,4'di(α,α-dimethyl-benzyl)diphenylamine, obtained as Naugard® 445 from Uniroyal Chemical, Middlebury, Conn. TGA wt. loss temp. (10%)=300° C.

Aryl Amine 2

N,N'-diphenyl-p-phenylenediamine, obtained as Naugard J from Uniroyal Chemical, Middlebury, Conn.). TGA wt. loss temp. (10%)=254° C.

Hindered Phenol

Tetrakis (methylene (3,5-di-(tert)-butyl-4-hydroxyhydrocinnimate)) methane, obtained as Irganox 1010 from Ciba Specialty Chemicals (Tarrytown, N.Y.). TGA wt. loss temp. (10%)=328° C.

Cu Stabilizer 1

Pelletized blend of 8.5% CuI, 85.0% KI and 6.5% magnesium stearate, obtained as ASC-300 from Mallinckrodt (St. Louis, Mo.).

Cu Stabilizer 2

Pelletized blend of 6.3% CuI, 60.7% KI, 24.6% Talc and 8.4% magnesium stearate, obtained as ASC-200 from Mallinckrodt (St. Louis, Mo.).

Gray Pigments

A (25:1) mixture of titanium dioxide (Kronos 2220, from Kronos, Inc., TX) and carbon black (Black Pearls 880, from Cabot Corp., MA).

Glass Fibers

Chopped glass fiber, 10 micron diameter, amino-silane size treated, obtained as Certain Teed 994 from Vetrotex Certain Teed Corp., (Valley Forge, Pa.).

Examples 1 and 2, and Control Examples C-1–C-2

The molding formulations of Examples 1 and 2 and Control Examples C-1 and C-2, summarized in Table 1, were compounded on a ZSK 40 twin screw extruder at 350° C., pelletized, and dried in a vacuum oven for 12 hr. The pelletized resins were injection molded to provide ASTM ⅛ in. Type 1 tensile bars using a 300 ton Toyo molding machine; the tool was heated to approximately 140° C. with circulating hot oil.

TABLE 1

|  |  | C-1 | C-2 | Ex. 1 | Ex. 2 |
| --- | --- | --- | --- | --- | --- |
| PPA-2 | pbw | 63.7 | 63.1 | 62.85 | 62.85 |
| Modifier 2 | pbw | 3.3 | 3.3 | 3.3 | 3.3 |
| Hindered Phenol | pbw | — | — | — | 0.25 |
| Aryl Amine 1 | pbw | — | — | 0.25 | — |
| Cu Stabilizer 2 | pbw | — | 0.6 | 0.6 | 0.6 |
| Time to 50% tensile loss | hr | 690 | 1205 | 1275 | 1240 |
| Shots until Burn |  | >600 | 185 | >600 | 260 |

Note: All formulations contain 33.0 pbw glass fiber; see text.

It will be apparent from a consideration of the long term thermal stability of the glass fiber-filled polyamide resin formulations set forth in Table 1, as represented by "Time to 50% tensile loss" values, that impact modified formulations containing no copper stabilizer exhibit poor long term thermal stability. Even so, these unstabilized formulations allow a large number of molding cycles or "shots" without clogging of the vents due to production of mold vent-clogging byproducts, demonstrated by the high values for "Shots until Burn".

Adding a copper-containing stabilizer to impact modified polyamide formulations will be seen to have significantly improved the long term thermal stability of the formulation; compare "Time to 50% tensile loss" values for C-2 and C-1. However, the production of mold vent-clogging byproducts was also significantly increased, leading to rapid clogging of vents; compare the values for "Shots until Burn" for Control Example C-2 with C-1.

The filled polyamide formulation according to the invention comprising impact-modified polyamide resin, copper stabilizer and a low volatility secondary aryl amine (Aryl Amine 1, TGA weight loss 300° C.), set forth as Example 1, will be seen to exhibit substantial long term thermal stability, together with a reduction in vent-clogging byproducts, as shown by the high value for "Shots until Burn".

High molecular weight hindered phenol compounds may not be as effective as secondary aryl amines for these purposes; a copper stabilized formulation according to the invention containing a high molecular weight hindered phenol will be seen to also exhibit good long term stability, but a lesser reduction in mold vent-clogging byproducts. Compare "Shots until Burn" values for Example 2 and C-2.

Thus, it will be seen that adding a high molecular weight, low volatility secondary aryl amine or hindered phenol to copper-stabilized impact-modified polyamides affords an improvement in molding characteristics, demonstrated by a lower production of mold vent-clogging byproducts and a concomitant increase in the number of molding shots before burned parts are produced.

Examples 3 and 4, and Comparison Examples C4–C-6.

Additional examples of formulations according to the invention comprising an unfilled, copper-stabilized, impact modified polyamide and a hindered phenol, together with three additional Control Examples are summarized in Table 2. The formulations were compounded on a ZSK 40 twin screw extruder at 350° C., pelletized, and dried in a vacuum oven for 12 hr. The pelletized resins were injection molded to provide ASTM 1/16 in. flex bars and type 4 tensile bars using a 300 ton Toyo molding machine; the tool was heated to approximately 120° C. with circulating hot oil.

TABLE 2

|  |  | C-4 | C-5 | C-6 | 3 | 4 |
| --- | --- | --- | --- | --- | --- | --- |
| PPA-1 | pbw | 82.6 | 81.6 | 81.45 | 81.45 | 81.35 |
| Modifier 1 | pbw | 15.0 | 15.0 | 15.0 | 15.0 | 15.0 |
| Aryl Amine 2 | pbw | — | — | 0.15 | — | — |
| Hindered Phenol | pbw | — | — | — | 0.15 | 0.25 |
| Cu Stabilizer 1 | pbw | — | 1.0 | 1.0 | 1.0 | 1.0 |
| HTDA, | ° C. | 120 | 120 | 120 | 120 | 120 |
| Retained E | % | <2 | 40 | 45 | 40 | 42 |
| Shots until Burn |  | 2867 | 275 | 200 | 800 | 1085 |

Notes: All formulations contain 1.2 pbw processing aids and 1.2 pbw gray pigment.

It will again be seen from a consideration of the long term thermal stability of the unfilled polyamide resin formulations set forth in Table 2, as represented by the "Retained E" values, that impact modified polyamide compositions having no copper-containing stabilizer exhibit poor long term thermal stability. However, these unstabilized formulations will be seen to also have a low production of mold vent-clogging byproducts, thus allowing a large number of molding cycles or "shots" without causing clogging of the vents, as shown by the high values for "Shots until Burn". See Control Example C-4.

Adding only a copper-containing stabilizer to the formulation substantially improved the long term thermal stability, however, the production of mold vent-clogging byproducts also substantially increased, leading to rapid clogging of the vents. Compare the values for "Shots until Burn" for Control Example C-5 with C4.

Adding a volatile aryl amine (Aryl Amine 2, MW=236 g/m, TGA weight loss 254° C.) to the copper-stabilized impact modified polyamide formulation will be seen to provide no improvement in molding characteristics. The "Shots until Burn" values for the formulation, and hence the length of time between mold cleanings, remain unacceptably low. Compare Control Example C-6 with C-4 and C-5.

The filled polyamide formulation according to the invention comprising impact-modified polyamide resin, copper stabilizer and high molecular weight, low volatility hindered phenol, set forth as Examples 3 and 4, will be seen to exhibit substantial long term thermal stability, together with a moderate reduction in vent-clogging byproducts. Compare the values for, "Shots, until Burn" for Examples 3 and 4 with Control Example C-5.

The invention will thus be seen to be a composition comprising a high temperature partially aromatic polyamide together with an impact modifier, a copper-containing stabilizer and a high molecular weight compound having low volatility selected from the group consisting of hindered phenols and secondary aryl amines, and including molded articles comprising the invented formulation. The hindered phenols and secondary aryl amines preferred for use in the practice of this invention will have a molecular weight of at least 260 g/m, and have a 10% weight loss temperature as determined by thermogravimetric analysis (TGA) of at least 290° C., more preferably at least 300° C. and most preferably at least 310° C. The invention further contemplates a method for improving the thermal oxidative stability of copper-stabilized, impact-modified partially aromatic polyamides by incorporating therein from about 0.01 to about 3.0 wt. %, preferably from about 0.1 to about 2.0 wt. %, based on the weight of polyamide present in the composition, of a low volatility secondary aryl amine or hindered phenol. The invented formulations exhibit improved injection molding characteristics, as demonstrated by a significant increase in the number of molding cycles that may be accomplished before sufficient mold vent-clogging deposits form to plug the vents and cause part burning and discoloration.

Although the invention has been described and illustrated by way of specific embodiments set forth herein, still further modifications and variations will be readily apparent to those skilled in the resin formulating and composite fabricating art. For example, the invented compositions may further comprise, in addition to the fillers and reinforcement as set forth herein before, conventional additives such as pigments, dyes, lubricants, processing aids, light and heat stabilizers, and the like, known for use with high temperature polyamides. The invented compositions may also be further compounded to form blends with additional polymers and resins as is well known in the art.

These and other such variations and modifications will be readily apparent to those skilled in the polymer arts and thus are contemplated as lying within the scope of the invention which is defined solely by the appended claims.

What is claimed is:

1. An injection moldable composition comprising
   (a) a high temperature, partially aromatic polyamide comprising aliphatic diamine terephthalamide units represented by the following structural formula:

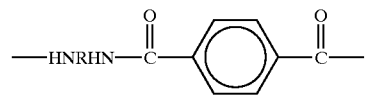

wherein R comprises at least one $C_2$–$C_{14}$ aliphatic hydrocarbyl radical;
   (b) an olefinic impact modifier;
   (c) from 0.01 to about 2 wt. %, based on total weight of the composition, of a copper-containing thermal stabilizer formulation comprising an alkali metal halide and a copper (I) halide in a weight ratio of from about 2.5:1 to about 20:1; and
   (d) from 0.01 to about 3 wt. %, based on total weight of the composition, of at least one compound selected from secondary aryl amines and hindered phenols, wherein said compound has a molecular weight of at least 260 g/m and a 10% wt. loss temperature of at least 290° C., as determined by TGA according to ASTM D 3850-94.

2. The composition of claim 1 wherein said thermal stabilizer formulation comprises potassium iodide and copper(I) iodide.

3. The composition of claim 1 further comprising from about 5 to about 60 wt. % filler.

4. The composition of claim 3 wherein said filler is glass fiber.

5. The composition of claim 1 wherein said modifier is a functionalized polyolefin.

6. The composition of claim 1 wherein said modifier is a pendant succinic anhydride-functionalized block copolymer comprising polymerized styrene blocks and rubber blocks comprising ethylene/propylene, ethylene/butylene or ethylene/pentylene polymer blocks or a combination thereof.

7. The composition of claim 1 wherein said compound is a secondary aryl amine having a molecular weight greater than about 260 g/m and a 10% TGA wt. loss temperature of at least 300° C.

8. An injection molded article comprising the composition of claim 1.

9. An extruded article comprising the composition of claim 1.

10. A method for improving the thermal stability of an impact-modified high temperature polyamide formulation comprising a high temperature, partially aromatic polyamide, an olefinic impact modifier and a copper-containing thermal stabilizer, said method comprising compounding said formulation with from about 0.01 to about 3.0 wt. %, based on total weight, of a compound selected from the group consisting of secondary aryl amines and hindered phenols, said compound having a molecular weight greater than about 260 g/m and a TGA 10% wt. loss temperature greater than about 290° C.

11. The method of claim 10 wherein said compound is a secondary aryl amine.

12. The method of claim 11 wherein said formulation comprises from about 0.1 to about 2.0 wt. % said secondary aryl amine, based on total weight.

13. The method of claim 11 wherein said secondary aryl amine is 4,4'-di(α,α-dimethyl-benzyl)diphenylamine.

14. The method of claim 10 wherein said copper-containing thermal stabilizer formulation comprises an alkali metal halide and a copper (I) halide in a weight ratio of from about 2.5:1 to about 20:1.

15. The method of claim 10 wherein said formulation further comprises from about 5 to about 60 wt. % filler.

16. The method of claim 15 wherein said filler is glass fiber.

17. The method of claim 10 wherein said high temperature, partially aromatic polyamide comprises aliphatic diamine terephthalamide units represented by the following structural formula:

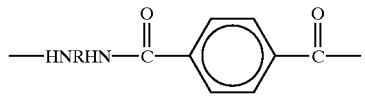

wherein R comprises at least one of $C_2$–$C_{14}$ aliphatic hydrocarbyl radical.

18. The method of claim 10 wherein said modifier is selected from functionalized polyolefins and pendant succinic anhydride-functionalized block copolymers comprising polymerized styrene blocks and rubber blocks comprising ethylene/propylene, ethylene/butylene or ethylene/pentylene polymer blocks or a combination thereof.

* * * * *